United States Patent [19]

Sheridan

[11] Patent Number: 4,998,842
[45] Date of Patent: Mar. 12, 1991

[54] OVERCENTER COLLET SPACE STATION TRUSS FASTENER

[75] Inventor: Philip L. Sheridan, Raleigh, N.C.

[73] Assignee: The United States of America as represented by the Administrator of the National Aeronautics and Space Administration, Washington, D.C.

[21] Appl. No.: 516,856

[22] Filed: Apr. 30, 1990

[51] Int. Cl.$^5$ .............................................. B25G 3/00
[52] U.S. Cl. .................................... 403/252; 403/171; 403/176; 52/646
[58] Field of Search ............... 403/171, 172, 176, 252; 24/453, 604, 606, 607; 52/646, 648

[56] References Cited

U.S. PATENT DOCUMENTS

| | | | |
|---|---|---|---|
| 2,327,951 | 8/1943 | Zaleske | 287/104 |
| 3,424,050 | 1/1969 | Burrow et al. | 24/453 X |
| 3,864,049 | 2/1975 | Ono | 403/171 |
| 4,313,687 | 2/1982 | Apeztegui et al. | 403/171 |
| 4,345,849 | 8/1982 | Stenemann | 403/252 |
| 4,677,804 | 7/1987 | Holt | 52/648 |
| 4,763,459 | 8/1988 | Wesselski | 52/646 |

Primary Examiner—Andrew V. Kundrat
Attorney, Agent, or Firm—Russell E. Schlorff; Harold W. Adams; Edward K. Fein

[57] ABSTRACT

A quick-connect fastener is arranged with a tubular body that is arranged to be engaged against the exterior surface of a hollow attachment fitting and coincidentally aligned with an opening in the fitting. A collet having normally-contracted fingers with outwardly-enlarged ends is operatively arranged in the body to be moved forwardly by an expander member mounted in the tubular body for advancing the collet fingers through the opening in the attachment fitting. Biasing means are arranged between the expander member and a toggle linkage in the tubular body which is selectively operated to urge the expander member forwardly into engagement with the collet fingers with an initial biasing force to advance their forward portions through the body opening and then expand them outwardly. The biasing means also provide a subsequent biasing force for retaining the collet members in their expanded positions once their enlarged forward end portions are on the opposite side of the body.

18 Claims, 2 Drawing Sheets

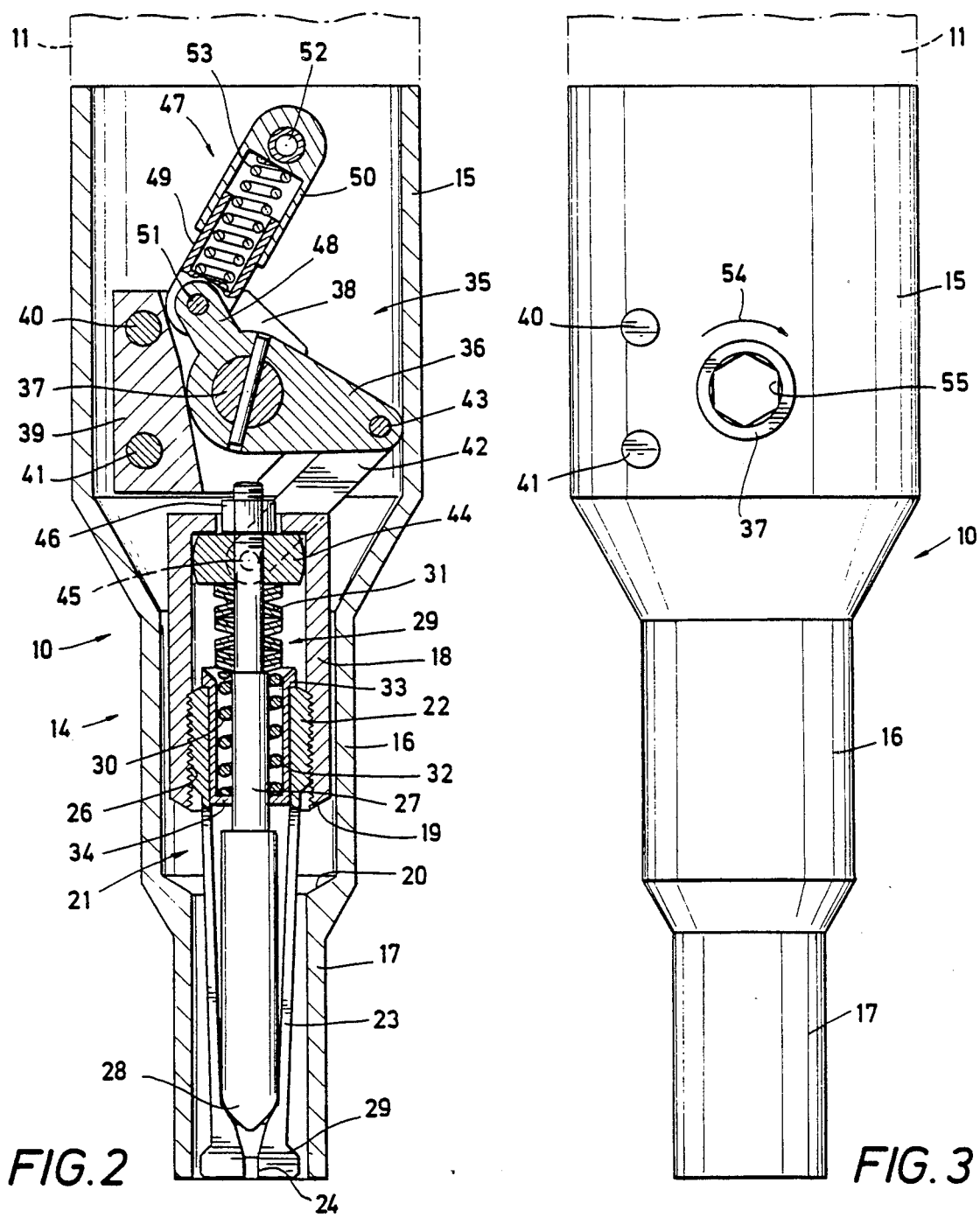

FIG.4
FIG.5
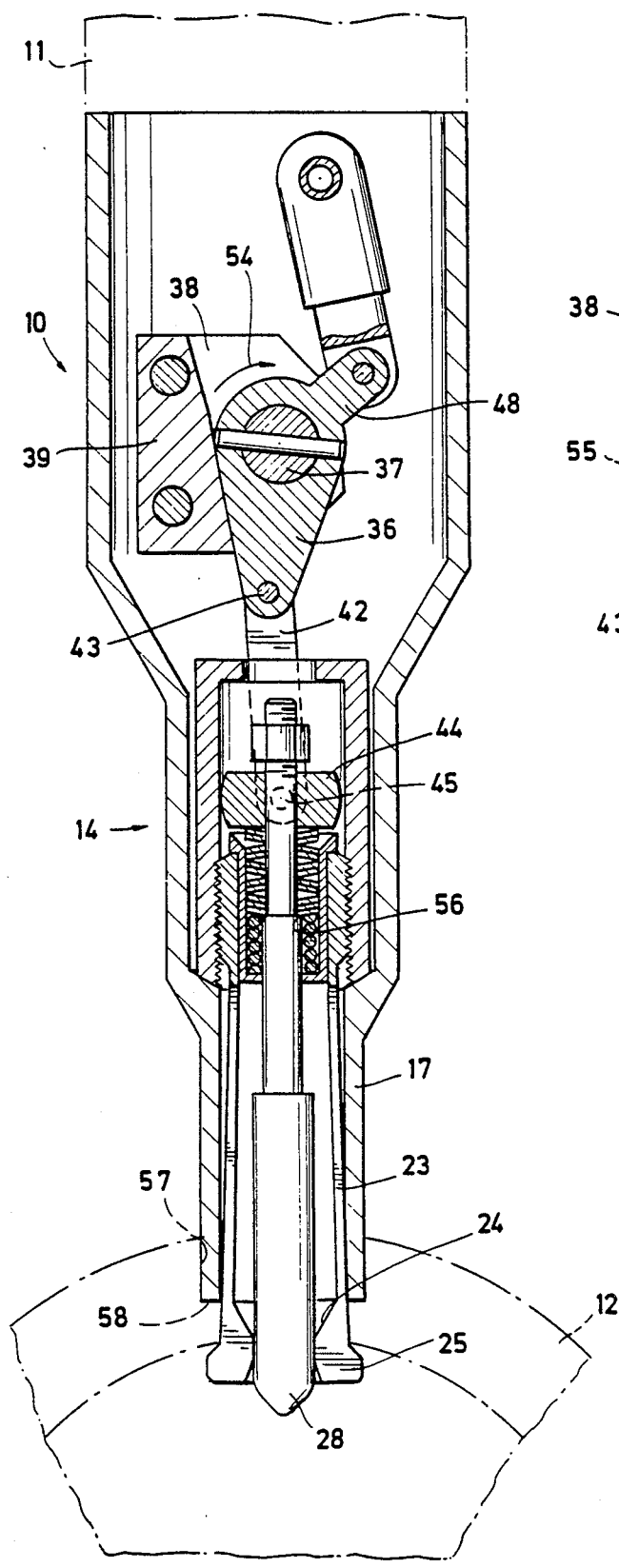
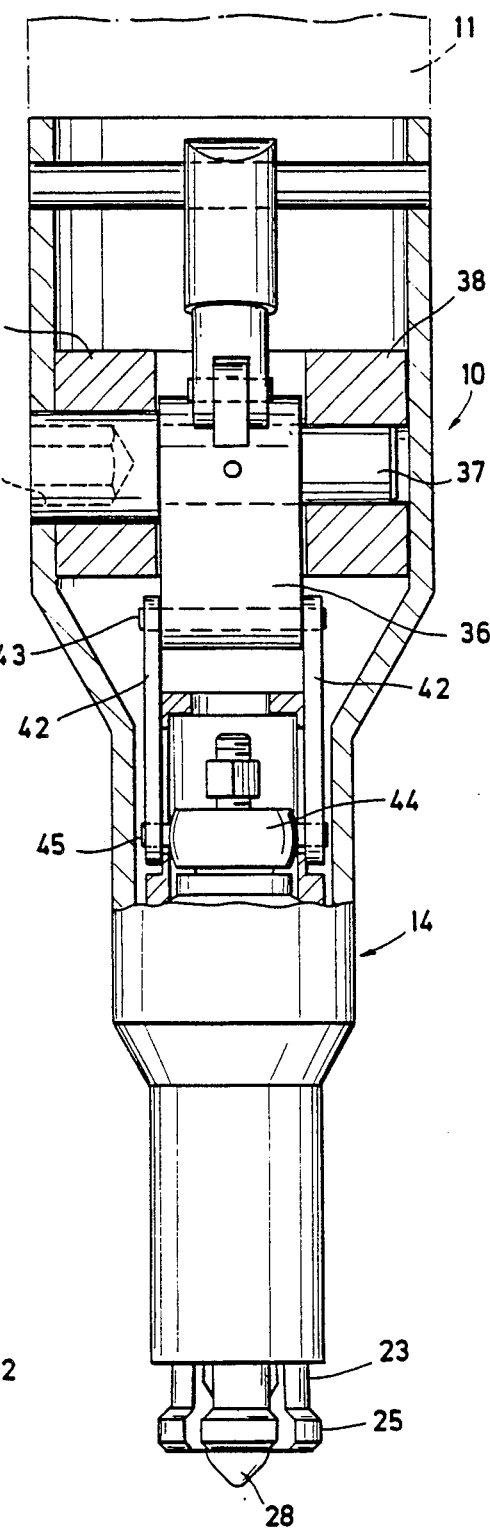

OVERCENTER COLLET SPACE STATION TRUSS FASTENER

ORIGIN OF THE INVENTION

The invention described herein was made by an employee of the United States Government and may be manufactured and used by or for the Government of the United States without the payment of any royalties thereon or therefor.

BACKGROUND OF THE INVENTION

1. Field of the Invention

Many proposals have been made heretofore to construct permanent stations in outer space which will include various structures that must be assembled either by human astronauts or by employing remotely-controlled robots.

Accordingly, the present invention pertains to new and improved fastener devices which are cooperatively arranged for easily and quickly connecting and disconnecting various sub-assemblies or elements that are disposed in outer space. In particular, this invention relates to new and improved quick-connect fastener devices which can be effectively used by either astronauts or robots in outer space for securely intercoupling various structural members as well as quickly joining various components which are to be assembled and, as needed, subsequently disassembled with minimum effort.

2. Background Art

At present, it is proposed to construct the NASA space station by assembling a plurality of prefabricated tubular truss members into predetermined spatial configurations. The truss members are coupled to one another by fasteners which are comprised of special end fittings on the truss members that are arranged to be respectively attached to so-called "node-point" fittings. In the preferred manner of arranging these fasteners, a male projection on each end fitting is adapted to be releasably secured within a selected socket on these node-point fittings. To facilitate the assembly of the truss members into different configurations, these sockets are spatially disposed around these node-point fittings so that the truss members may be positioned in various orientations relative to one another and coupled to one another by means of the node-point fittings.

One particularly useful fastener system which has been proposed heretofore for assembling structures in outer space is disclosed in U.S. Pat. No. 4,763,459. The node-point fittings shown in that patent are formed as hollow spherical shells respectively having a number of spatially-disposed outwardly-facing openings into which tubular inserts may be selectively mounted. Each of these end fittings includes a forwardly-projecting multifingered collet which is inserted into one of the tubular inserts and expanded for releasably locking the end fitting to the node-point fitting. In this manner, with these end fittings mounted on the opposite ends of a plurality of tubular truss members, the truss members can be coupled to a commensurate number of these node-point fittings for readily assembling a variety of structures of predetermined configurations in outer space with a minimum of effort.

Those skilled in the art will, of course, realize that any type of fastener which is to be utilized for assembling structures in outer space must be capable of being easily and quickly installed by personnel working under the adverse conditions of outer space. Moreover, once the respective components of a given structure have been intercoupled, it is absolutely essential that, once they have been coupled together, these components must remain securely locked to one another until the structure is ultimately disassembled. It should also be appreciated that it may be necessary in the future to use remotely-controlled devices for assembling a variety of components which are to be disposed in outer space. Thus, any fastener system which is to be utilized in outer space for erecting structures or intercoupling various devices must be capable of being operated by astronauts as well as by means of remote-controlled assembly tools.

SUMMARY OF THE INVENTION

Accordingly, it is an object of the present invention to provide new and improved fasteners for use in outer space for quickly and reliably connecting a variety of members.

It is a further object of the invention to provide new and improved quickconnecting fasteners that can be utilized by astronauts or by remotelycontrolled devices for readily assembling different types of structures in outer space.

These and other objects of the invention are attained by providing a fastener device to be releasably secured to a member that has an opening extending between its outer and inner wall surfaces. The fastener device includes a body having a forward end adapted to be engaged with the outer wall of the member and a tubular collet that is arranged on the fastener body for movement axially between retracted and extended positions. The tubular collet includes forwardly-projecting flexible fingers with outwardly-enlarged forward portions which are sized so as to collectively pass through the opening so long as the fingers are in their normally-collapsed positions. An elongated expander is arranged on the fastener body to be advanced forwardly within the collet for expanding the forward portions of the collet fingers. Actuating means include a toggle linkage which is pivotally mounted on the fastener body for movement from a contracted position to an extended position once the forward end of the fastener body has been engaged against an outer surface of the body adjacent to an opening therein. Biasing means are cooperatively arranged between the expander and the toggle linkage for responding to the movement of the toggle linkage toward its extended position for urging the expander member forwardly into engagement with the collet fingers with an initial biasing force sufficient to advance their forward portions through the opening in that member and thereafter expand the collet members once their enlarged forward end portions are on the opposite side of that member. The biasing means are further operable for securing the collet members in position with a stronger biasing force. The actuating means are also arranged so that whenever the toggle linkage is subsequently pivoted toward its initial contracted position, the expander will be returned to its original position thereby enabling the collet fingers to return to their inwardly-contracted positions and allow the collet fingers to be withdrawn from the opening in the member.

BRIEF DESCRIPTION OF THE DRAWINGS

The several features of the invention are set forth with particularity in the appended claims. The arrangement and practice of the invention, together with further objects and various advantages thereof, may best be understood by way of the following description of an exemplary apparatus which incorporates the principles of the invention as shown in the accompanying drawings, in which:

FIG. 1 illustrates a portion of a structure which has been assembled in outer space by utilizing quick-disconnect fasteners in keeping with the principles of the invention;

FIG. 2 is a cross-sectioned elevational view of a preferred embodiment of a quick-disconnect fastener that is arranged in accordance with the principles of the present invention for readily assembling and disassmbling two or more objects in outer space;

FIG. 3 is an exterior view of the new and improved quick-disconnect fastener depicted in FIG. 2;

FIG. 4 is a cross-sectioned elevational view similar to FIG. 2 but illustrating the quick-disconnect fastener of the present invention after it has been installed into and securely locked to a typical node-point fitting for interconnecting one of a plurality of truss members which are being used for erecting a structural assembly such as the spatial structure partially depicted in FIG. 1; and FIG. 5 is a partially cross-sectioned elevational view of the quick-disconnect fastener of the invention as it will appear from an orthogonal perspective at right angles to the view seen in FIG. 4.

DETAILED DESCRIPTION OF THE PREFERRED EMBODIMENT

In FIG. 1 a partial isometric view is seen of a group of the new and improved quick-connect fastener devices 10 of the present invention that are respectively mounted on the ends of a corresponding number of elongated tubular members, as at 11, for selectively coupling and uncoupling the ends of these tubular members to common node-point fittings, as at 12, in order to assemble an elaborate spatial structure 13 of a predetermined configuration in outer space. It must also be recognized that although the node-point fittings are respectively illustrated in FIG. 1 as being positioned at the corners of the structure 13, these fittings 12 can also be utilized for tandemly coupling two or more of the tubular members 11 should it be desired to provide truss members of greater lengths. Moreover, by employing node-point fittings (such as those shown at 12) which have a number of unused apertures to which additional fastener devices (such as those shown at 10) can be coupled, a number of other tubular members (such as those shown at 11) can be added to these node-point fittings as needed to construct structures having a variety of configurations such as the structure 13. It should, also, be realized that although the forthcoming description of the new and improved quick-connect devices 10 is specifically directed to their particular utilization to couple elongated tubular members (such as those shown at 11) and end fittings (such as those shown at 12) for assembling structures (such as shown at 13) in outer space, the scope of the present invention is considered as also including the utilization of the quick-connect devices in keeping with the principles of the present invention for interconnecting a variety of one or more disparate objects without requiring elaborate manipulations or significant forces to selectively couple and uncouple those various objects.

Turning now to FIG. 2, a cross-sectioned elevational view is shown of one of the new and improved quick-connect fasteners 10 which is cooperatively arranged in accordance with the principles of the present invention. As depicted, the new and improved fastener device 10 includes a first member 14 that is preferably arranged as a elongated tubular body which has an enlarged-diameter rearward portion 15, an intermediate portion 16 of somewhat-smaller diameter and a reduced-diameter forward portion 17. Those skilled in the art will, of course, appreciate that the rearward portions 15 of the body members 14 may be arranged in various ways for coupling the quick-connect assemblies 10 of the present invention to their respective tubular members 11. By way of example, the enlarged rearward portions 15 of the fastener bodies 14 may be butt-welded to the ends of the tubular members 11. Alternatively, as described in detail in the above-mentioned U.S. Pat. No. 4,763,459, so-called "strut end adapters" may be telescopically fitted into the open ends of the tubular members 11 and threadedly attached to the rearward body portions 15 of the fastener bodies 14. It will be appreciated, of course, by those who are skilled in the art that the present invention is wholly independent of any particular arrangement or technique for attaching the tubular members 11 to the fastener bodies 14.

The new and improved fastener device 10 also includes a second member 18 which is preferably arranged as a tubular body coaxially disposed within the outer body member 14 and adapted to be axially moved therein between its illustrated rearward position and a forward position depicted in FIG. 4. As will be subsequently described by reference to FIG. 4, in the preferred embodiment of the fastener device 10, the forward position of the inner member 18 is achieved when its forward end 19 has been shifted into engagement with the rearwardly-directed inward shoulder 20 in the body 14 which is defined therein by the frustoconical transition at the junction of the intermediate and reduced-diameter portions 16 and 17 of the outer body member. The overall stroke or axial travel of the inner member 18 in the outer body 14 is, therefore, determined by the longitudinal spacing between the two opposed surfaces 19 and 20.

In the preferred embodiment of the fastener device 10, the tubular member 18 is cooperatively arranged for carrying a tubular collet member 21 having a base portion 22 which supports a plurality of flexible fingers, as at 23, that are extended longitudinally ahead of the inner member 18 and biased inwardly to normally maintain the inward surfaces of the respective end portions of the fingers engaged with one another. In the preferred manner of fabricating the collet member 21, circumferentially-spaced longitudinal slits are cut along almost the entire length of the tubular member for cooperatively defining the forwardly-projecting flexible fingers 23. The forward end portion of the tubular collet member 21 is shaped for defining inwardly-projecting inner shoulders, as at 24, and outwardly-enlarged outer shoulders, as at 25, on the forward ends of the fingers. To facilitate the accurate axial placement of the collet fingers 23 with respect to the elongated inner member 18, the internal bore of the inner member is appropriately sized and threaded, as shown generally at 26, to threadedly receive the externally-threaded base portion of the collet member 22. It will, of course, be appreciated that the adjustment of the collet member 22 within the inner member 18 will be carried out as the fastener device 10 is being assembled.

To selectively expand the forward ends of the collet fingers 23, an elongated axial rod 27 is coaxially arranged within the tubular member 18 and adapted for movement along the central longitudinal axis of that member. As shown in FIG. 2, the axial rod 27 is positioned within the collet member 21 so that normally the tapered forward end portion 28 of the axial rod will be disposed within the rearwardly-facing frustoconical cavity as collectively defined by the inwardly-directed and rearwardly-facing shoulders 24 of the several collet fingers 23 when the fingers are in their usual inwardly-biased positions. As will be subsequently described in detail by reference to FIG. 4, the inwardly-directed shoulders 24 of the collet fingers and the tapered forward end portion 28 of the axial rod 27 are cooperatively sized and complementally shaped so that, as the rod is moved forwardly with respect to the inner member 18, the tapered end portion of the rod will be effective for progressively expanding the inwardly-contracted forward end portions of the collet fingers 23 radially outwardly in relation to one another.

As generally illustrated at 29 in FIG. 2, the new and improved fastener device 10 further includes biasing means preferably comprised of a relatively-weak coil spring 30 and a stack of disc springs, such as Belleville washers 31, that are coaxially arranged around the central portion of the axial rod 27 and tandemly disposed in a stack in the inner member 18. To support the stacked springs 30 and 31 in the inner member 18, a tubular spring retainer 32 is coaxially disposed within the base portion of the collet member 22 and positioned so that an outwardly-directed flange 33 around the rear end of the retainer will be supported on the rear surface of the collet base portion and an inwardly-directed flange 34 on the forward end of the spring retainer will be supporting the forward end of the coil spring.

In keeping with the objects of the present invention, the new and improved quick-coupling fastener device 10 further includes actuating means as indicated generally at 35 arranged for selectively positioning the axial rod 27. As best seen in FIGS. 2 and 5, the actuating means 35 include an actuating link 36 that is pivotally supported within the outer member 14 on a sturdy transverse axle 37 cooperatively journalled between a spaced pair of uprights, as at 38, of a bifurcated support bracket 39 that is mounted within the outer member by fastener means such as a pair of transverse bolts 40 and 41 secured to the opposite sides of the enlarged portion 15 of the outer member. As shown in FIG. 2, the actuating link 36 is cooperatively positioned so that when the axial rod 27 is in its normal retracted position with respect to the outer body, the link will be almost perpendicular to the central longitudinal axis of the body 14 but inclined slightly forwardly so that the free end of the actuating link will be situated a short distance in advance of its pivotal axis as defined by the axle 37.

The actuating means 35 further include a spaced pair of connecting links 42 which are positioned with their rearward ends on opposite sides of and straddling the free end of the first link 36 and pivotally coupled thereto by a transverse pivot pin 43. These spaced connecting links 42 are inclined forwardly and positioned so that their respective forward ends are disposed on opposite sides of an annular retainer member 44 that is loosely disposed on the rearward portion of the axial rod 27 and rested on the rearward face of the stacked Belleville washers 31. To pivotally couple these connecting links 42 to the retainer member 44, a pair of outwardly-projecting trunnions or stubs 45 are preferably arranged on opposite sides of the retainer and have their free ends respectively journalled within inwardly-facing lateral openings that are arranged on the forward ends of the paralleled connecting links.

The actuating means 35 further include an adjustment nut 46 that is threadedly coupled to the rearward end of the axial rod 27 and positioned so that it is normally engaged against the rearward face of the retainer member 44. In this way, the adjustment nut 46 is utilized for selectively positioning the retainer 44 on the axial rod 27 as required for regulating the preloaded biasing force that the stacked Belleville washers 31 will impose on the axial rod during the operation of the new and improved quick-connect fastener device 10 of the present invention.

To maintain the links 36 and 42 in their respective operating positions, spring-biased detent means, as shown generally at 47, are cooperatively arranged inside of the outer member 14 and located just to the rear of the free end portion 48 of the first link 36. As depicted in FIG. 2, the detent means 47 have inner and outer telescoped members 49 and 50 respectively having their outer ends pivotally coupled, as indicated at 51, to the free end 48 of the first link 36 and, as indicted at 52, to the rearward portion 15 of the outer body 14. The telescoped members 49 and 50 also define an inner space for enclosing a coil spring 53 that is compressed between the free end 48 of the first link 36 and the enclosed rearward end of the outer spring retainer 50 for imposing a moderate biasing force on the first link which is sufficient to prevent the first link from being inadvertently rotated out of whichever of its two operating positions it is then situated in.

By comparing FIGS. 2 and 4, those skilled in the art will appreciate that the actuating links 36 and 42 as well as their respective pivots 37, 43 and 45 are cooperatively positioned in relation to one another for defining a typical toggle mechanism which will positively advance the axial rod 27 from its retracted position (as shown in FIG. 2) to its extended position (as illustrated in FIG. 4) whenever the shaft 37 is turned in the direction indicated by the arrow 54. Similarly, it will be appreciated that once the axial rod 27 has been advanced to its extended position, turning the actuating shaft 37 in the opposite direction will be effective for returning the axial rod 27 to its retracted position.

Accordingly, it must be recognized that by virtue of cooperatively arranging the actuating means 35 to include the above-described toggle mechanism, the quick-connect fastener device 10 of the present invention is reliably and effectively operated by simply turning the actuating shaft 37 through a predetermined rotational arc. It will also be recognized that the force-multiplying characteristic of the above-described toggle mechanism allows the actuating means 35 to be operated with a minimum torque. As a result of these and other advantages provided by the toggle mechanism, the shaft 37 can be rotated by using any one of a variety of actuators. Nevertheless, in the preferred manner of rotating the shaft 37, one end of the shaft is extended through the wall of the enlarged-diameter portion 15 of the body 14. A hexagonal socket 55 is located in the center of the extended end portion of the shaft 37 in alignment with the central axis of the shaft 37 and appropriately sized for receiving a portable tool or a remotely-controlled actuator (neither of which is illustrated in the drawings) which is operable from outside of the fastener body 14 for turning the shaft back and forth as required to selectively shift the axial rod 27 between its retracted and advanced operating positions as respectively shown in FIGS. 2 and 4.

As illustrated in FIG. 4, by rotating the shaft 37 in the direction as indicated by the rotational arrow 54, the pivotal connection at 45 on the forward ends of the spaced links 43 will function for advancing the retainer member 44 forwardly in relation to the outer body 14. Forward travel of the retainer member 44 will, of course, impose a forward force on the coil spring 30 and the Belleville washers 31 that will act on the shoulder 34 for advancing the tubular member 18 toward the body shoulder 20 as the still-retracted forward end portions of the flexible collet fingers 23 are shifted out of the forward end of the outer body 14.

It will be appreciated from FIG. 4 that once the forward end 19 of the tubular member 18 engages the body shoulder 20, the coil spring 30 will begin to compress and allow the annular retainer member 44 to begin moving along the axial rod 27. The forward movement of the retainer member 44 will initially advance the stacked Belleville washers 31 still further into the tubular spring retainer 32 until the coil spring 30 has been fully compressed between the Belleville washers and the inwardly-turned flange 34 on the forward end of the spring retainer. This progressive compression of the coil spring 30 will, of course, impose a moderate forwardly-directed biasing force on the axial rod 27 that will be sufficient to shift the collet fingers 23 forwardly in relation to the body member 14.

Once the coil spring 30 has been fully compressed, the continued rotation of the shaft 37 will then be effective for compressing the stacked Belleville washers 31 between the retainer member 44 and a stop such as may be defined by a rearwardly-directed shoulder 56 appropriately arranged on the intermediate portion of the axial rod 27 for engagement with the forward end of the washer stack. The compression of the stacked Belleville washers 31 will be effective for developing a substantial pre-load biasing force on the rod 27 that will securely lock the fastener 10 to another object such as one of the node-point fittings 12.

It will, of course, be recognized by those with skill in the art that by employing biasing means such as the illustrated stack of Belleville washers 31, a significant biasing force can be easily developed with only a minimum longitudinal travel of the retainer member 44 in relation to the axial rod 27 being needed for compressing the Belleville washers. Moreover, by virtue of the toggle mechanism of the actuating means 35, the Belleville washers 31 can be readily compressed with a minimum of actuating force being required for turning the shaft 37 to its final operating position. By way of example, with the disclosed preferred embodiment of the new and improved quick-coupling device 10, it was found that a rotational torque of no more than one-hundred inch-pounds on the shaft 37 was sufficient to energize the stacked Belleville washers 31 for developing a compressive biasing force of about one-thousand pounds between the body 14 and the node-fitting 12. This is, of course, the direct result of the significant force multiplication provided by the toggle mechanism.

Accordingly, by comparing FIGS. 2 and 4, it will be appreciated that as the shaft 37 is rotated in the direction indicated by the rotational arrow 54, the link 36 will have been progressively rotated through a selected travel arc so as to bring the pivot pin 43 into direct alignment with the pivots 37 and 45. At this point, when the links 36 and 42 are directly aligned with one another, the annular retainer member 44 will have been advanced to its maximum forward position relative to the inner member 18.

In the preferred embodiment of the present invention, a selected travel arc in the order of seventy-five degrees was found to be sufficient for extending the collet member 12 out of the outer body 14 and into the node 12 and for developing the necessary biasing force with the Belleville washers 31 for securely engaging the rearward faces 25 of the collet fingers against the inner surface of the node-point fitting 12. In keeping with the operation of a toggle mechanism, in the preferred embodiment of the actuating means 35, the shaft 37 is arranged to be rotated slightly further through an additional minor travel arc (preferably somewhat in the order of five degrees) for displacing the pivot 43 on the other side of the center line between the two pivots 37 and 45. This additional travel arc will, of course, insure that the toggle mechanism will maintain the expander member 27 firmly engaged between the opposed end portions 24 of the collet fingers 23 without, however, significantly reducing the greater biasing force imposed by the Belleville washers 31 against the expander member.

It will also be appreciated by comparing FIGS. 2 and 4 that whenever the quick-disconnect fitting 10 is to be operated for securing a member such as one of the tubular structural members 11 to a second member such as one of the node-point fittings 12, the reduced-diameter forward end of the outer member 14 is engaged against the outer surface of the second member in axial alignment with an opening, as at 57, in the second member. As depicted in FIG. 4, this opening 57 may be moderately counterbored for partially receiving the forward portion of the outer member 14 so as to define a modest socket or recess with an outwardly-facing shoulder 58 on which the forward end of the outer member is rested. On the other hand, it will be recognized that the opening 57 may also be arranged without any counterbore so that the forward end of the outer member 14 will be placed on a suitable seating surface on the exterior of the second member 12 around that opening. Of particular importance to the practice of the present invention it should be noted that this latter arrangement will allow the axial member 27 to be subsequently retracted so that the quick-disconnect fitting 10 and its associated tubular member 11 can be readily uncoupled from the node-point fitting 12 without it even being necessary to change the relative positions of the other members included in that particular assembly such as the structure 13. This is, of course, a major advantage in those situations where adjacent elements of the structural assembly 13 should not be moved apart for even the minor distances needed to remove the forward end portion 17 of the coupling assembly from a counterbored or recessed opening as shown in FIG. 4.

Accordingly, it will be appreciated that by using the quick-coupling fastener devices 10 of the present invention, these devices can be easily coupled to other devices such as the node-point fittings 12 with a minimum of effort. Since the new and improved fastener devices 10 can be operated by simply turning the shaft 37 with a moderate force through a limited travel arc, it will be further realized that various actuating tools (none of which are depicted in the drawings) can be conveniently employed for rotating the shaft. For example, astronauts operating in outer space can employ a simple T-shaped so-called "hex wrench" which has a terminal portion sized to fit the socket 55 for manually assembling and disassembling spatial structures such as partially shown at 13 in FIG. 1. Moreover, those skilled in the art will, of course, recognize that there are many obvious advantages to utilize quick-coupling fastener devices, as at 10, where various diverse elements are to be repeatedly uncoupled and coupled in outer space without having to employ complicated and cumbersome actuating devices.

While only a particular embodiment of the apparatus of the present invention has been shown and described herein, it is apparent that various changes and modifications may be made without departing from the principles of the present invention in its broader aspects; and, therefore, the aim in the claims appended hereto is to cover all such changes and modifications as fall within the true spirit and scope of this invention.

What is claimed is:

1. A quick-connect fastener arranged to be coupled to a member having an opening extending between its outer and inner surfaces and comprising:
   a body arranged to be engaged with an outer surface of another member so that a selected axis of said body will be aligned with an opening in that other member;
   a tubular collet on said body and arranged for axial movement along said axis, said collet including forwardly-projecting flexible fingers with enlarged forward portions sized to pass through an opening in another member so long as said fingers are contracted inwardly;
   means on said body and said collet defining the forward position of said collet; and
   means operable for advancing said forward portions of said fingers through an opening in another member and then expanding them outwardly after passing through that opening including an expander movably arranged on said body for engaging said fingers, a force-transmitting member movably mounted on said expander, actuating means arranged between said force-transmitting member and said body for movement to an extended position for moving said force-transmitting member forwardly along said expander, first biasing means arranged between said expander and said force-transmitting member operable in response to movement of said actuating means toward said extended position for urging said expander against said fingers and shifting said collet to its said forward position to advance said inwardly-contracted forward portions of said fingers through an opening in that member and then radially expand said fingers after their forward portions have passed though the opening, and second biasing means arranged between said expander and said force-transmitting member and operable in response to movement of said actuating means to said extended position for urging said expander against said fingers to retain said body in engagement with that other member.

2. The quick-connect fastener of claim 1 wherein said body includes a rearward portion arranged to be tandemly coupled to a tubular member having its longitudinal axis in coincidental alignment with said selected axis of said body.

3. The quick-connect fastener of claim 1 wherein first and second biasing means are cooperatively arranged so that the biasing force that will be provided by said second biasing means is greater than the biasing force that will be provided by said first biasing means.

4. The quick-connect fastener of claim 1 wherein said first and second biasing means respectively include first and second stacked springs coaxially disposed around said axis and positioned between said force-transmitting member and said expander, said first spring being a coil spring operable for developing a first biasing force as said coil spring is compressed in response to the initial movement of said actuating means toward said extended position, and said second spring includes at least one disc spring operable for developing a second biasing force as said second spring is being compressed by the continued movement of said actuating means toward said extended position.

5. The quick-connect fastener of claim 4 wherein said first and second springs are cooperatively arranged so that said second biasing force that will be developed by said second spring is greater than said first biasing force that will be developed by said first spring.

6. The quick-connect fastener of claim 1 including detent means arranged on said body for releasably retaining said actuating means in said extended position.

7. The quick-connect fastener of claim 1 including a forward portion on said expander arranged to be engaged with said inwardly-contracted fingers for advancing their said forward portions through an opening in a member and a second portion on said expander arranged to engage said inwardly-contracted fingers for radially expanding their said forward portions after said fingers pass through that opening.

8. The quick-connect fastener of claim 1 wherein said fingers have inwardly-directed shoulders and said expander includes a reduced forward end and an enlarged intermediate portion arranged so that said forward end of said expander will engage said inwardly-directed shoulders of said fingers while they are still contracted inwardly for advancing their said forward portions through an opening in a member and said intermediate portion of said expander will then engage said inwardly-directed shoulders for radially expanding said forward portions of said fingers after they pass through that opening.

9. Structural members arranged to be quickly coupled together and comprising:
   a hollow attachment fitting having at least one opening between its outer and inner surfaces;
   a tubular member arranged to be aligned with an opening in said attachment fitting and having a forward end portion to be engaged against said outer surface of said attachment fitting surrounding said opening, a tubular collet coaxially arranged within said forward end portion of said tubular member for axial movement along its longitudinal axis, said collet including forwardly-extending flexible fingers having normally-contracted outwardly-enlarged end portions that are sized to pass through an opening in said attachment fitting when said fingers are contracted, and means for defining the forward position of said collet; and
   means releasably coupling said tubular member to said attachment fitting including an expander coaxially arranged within said tubular member and axially movable therein for engaging said fingers, a force-transmitting member movably mounted around said expander, actuating means arranged in said tubular member for movement to an extended position for shifting said force-transmitting member forwardly along said expander, first and second biasing springs coaxially mounted in said tubular member between said expander and said force-transmitting member, said first spring being operable in response to movement of said actuating means toward said extended position for urging said expander against said fingers for initially shifting said collet to its said forward position as said inwardly-contracted forward portions of said fingers are advanced through said opening in said attachment fitting and radially expanding said fingers once their forward portions have passed though the opening, said second spring being operable upon movement of said actuating means to said extended position for urging said expander against said fingers for retaining said body in engagement with said attachment fitting.

10. The structural members of claim 9 wherein said attachment fitting is a node-point fitting to be installed at one corner of an assembly of structural members.

11. The quick-connect fastener of claim 10 including detent means arranged on said body for releasably retaining said actuating means in said extended position.

12. A quick-connect fastener to be coupled to a hollow member having an opening therein and comprising:
    an elongated body to be engaged with an outer surface of a hollow member with a longitudinal axis of said body coincidentally aligned with an opening in that member;
    an elongated collet arranged on said body for axial movement along said axis and defining forwardly-projecting flexible fingers with normally-contracted enlarged forward portions arranged for passing through an opening in a hollow member while said fingers are contracted inwardly;
    an expander arranged on said body for moving along said axis into engagement with said fingers for advancing them through an opening in a hollow member while they are still contracted and then expanding their said forward portions of outwardly after they have passed through that opening;
    actuating means including a toggle mechanism on said body and having first and second arms with pivotally coupled adjacent ends, means slidably coupling the other end of said first arm to said expander, means pivotally coupling the other end of said second arm to said body, and means for moving said arms from a contracted position where their adjacent ends are on one side of said axis to an extended position where said arms are substantially parallel to said axis with their adjacent ends on the other side of said axis; and
    biasing means between said other end of said first arm and said expander and responsive to the movements of said arms toward said extended position for urging said expander against said collet fingers with a first force operable for advancing said forward portions of said collet fingers through an opening in that member and radially expanding said collet fingers outwardly once their forward portions have passed though the opening and thereafter with a second force operable for retaining said fingers firmly engaged against the inner surface of that member.

13. The quick-connect fastener of claim 12 wherein said body has a rearward portion arranged to be tandemly coupled to a tubular member with its longitudinal axis in coincidental alignment with said selected axis of said body.

14. The quick-connect fastener of claim 12 wherein said biasing means include first and second springs disposed in a stack around said axis between said actuator and said expander, said first spring being a coil spring operable for providing said first force as said coil spring is compressed by the movement of said forward end of said expander into engagement with said collet fingers, and said second spring including a disc spring operable for thereafter providing said second force as said second spring is being compressed by the movement of said actuator to its said extended position.

15. The quick-connect fastener of claim 12 further including detent means operatively arranged for releasably retaining said arms in their said extended position.

16. A quick-connect fastener for coupling tubular structural members to hollow node-point fittings having a plurality of openings therein and comprising:
    a tubular fastener body having a forward end portion arranged to be engaged against an outer surface of a node-point fitting around one of the openings therein with the longitudinal axis of said fastener body coincidentally aligned therewith;
    a tubular collet coaxially arranged in said fastener body for axial movement therein along its said longitudinal axis between longitudinally-spaced rearward and forward positions, said collet including a plurality of forwardly-projecting flexible fingers respectively having an internal rearwardly-facing shoulder and an outwardly-enlarged forward end portion which is sized to pass through an opening in a node-point fitting when said collet fingers are inwardly contracted;
    an elongated rod coaxially arranged in said fastener body to be shifted axially along said longitudinal axis of said fastener body, said elongated rod having a tapered end portion arranged to engage said rearwardly-facing shoulders of said inwardly-contracted collet fingers to advance their said forward end portions out of said forward end portion of said fastener body and through an opening in a node-point fitting and thereafter radially expand said collet fingers for positioning their said forward end portions adjacent to the inner surface of that node-point fitting;
    actuating means including a toggle mechanism disposed within a rearward portion of said fastener body including first and second elongated arms, means pivotally coupling the adjacent ends of said toggle arms to one another, means slidably coupling the other end of said first toggle arm to said elongated rod, means pivotally mounting the other end of said second toggle arm within said fastener body, and means for pivoting said toggle arms between a contracted operating position where said arms are inclined in relation to said longitudinal axis with their said adjacent ends laterally displaced on one side of said longitudinal axis and an extended operating position where said toggle arms are substantially parallel to said longitudinal axis with their said adjacent ends laterally displaced on the other side of said longitudinal axis; and
    biasing means arranged between said other end of said first arm an and said elongated rod and operable in response to the initial pivotal movements of said toggle arms toward their said extended operating position for urging said elongated rod forwardly against said rearwardly-facing surfaces on said collet fingers with a first biasing force sufficient to advance their forward portions through an opening in a node-point fitting and radially expand said collet fingers outwardly once their enlarged forward end portions have passed though that opening and are positioned adjacent to the inner wall of that node-point fitting and operable in response to the continued pivotal movements of said toggle arms to their said extended operating positions for developing a second biasing force for retaining said enlarged forward end portions engaged against the inner wall of that node-point fitting.

17. The quick-connect fastener of claim 16 further including detent means operatively arranged between said fastener body and one of said toggle arms for releasably retaining them in their said operating positions.

18. The quick-connect fastener of claim 16 wherein said means pivotally mounting said other end of said toggle arm within said fastener body include a transverse shaft coupled to said other end of said toggle arm and having an end accessible from the exterior of said fastener body; and said means for pivoting said toggle arms include a socket with torque-transferring surfaces coaxially disposed in said accessible end of said shaft and sized for receiving the free end of an actuator arranged to be complementally fitted into said socket and rotated to provide sufficient torque for pivoting said toggle arms between their said operating positions.

* * * * *